(12) United States Patent
Pieroni et al.

(10) Patent No.: US 6,526,808 B1
(45) Date of Patent: Mar. 4, 2003

(54) SMOKE AND CLEAN AIR GENERATING MACHINE FOR DETECTING PRESENCE AND LOCATION OF LEAKS IN A FLUID SYSTEM

(75) Inventors: Kenneth Alan Pieroni, Fullerton, CA (US); Jim Eli Saffie, Santa Monica, CA (US)

(73) Assignee: Star EnviroTech, Inc., Costa Mesa, CA (US)

( * ) Notice: Subject to any disclaimer, the term of this patent is extended or adjusted under 35 U.S.C. 154(b) by 0 days.

(21) Appl. No.: 09/348,320

(22) Filed: Jul. 7, 1999

(51) Int. Cl.⁷ ............................................. G01M 3/04
(52) U.S. Cl. ................................................ 73/40.7
(58) Field of Search .......................... 73/40.7; 239/128, 239/129

(56) References Cited

U.S. PATENT DOCUMENTS

| | | | | |
|---|---|---|---|---|
| 2,686,160 A | * | 8/1954 | Kell et al. ................. | 252/359 |
| 3,361,547 A | * | 1/1968 | Packo ........................ | 48/193 |
| 3,406,017 A | * | 10/1968 | Canning ...................... | 23/232 |
| 3,483,735 A | * | 12/1969 | Packo ......................... | 73/40.7 |
| 3,887,716 A | * | 6/1975 | Seelbach ................... | 426/231 |
| 4,155,249 A | * | 5/1979 | Scott ......................... | 73/40.7 |
| 4,330,428 A | * | 5/1982 | Clifford ..................... | 252/359 |
| 4,594,251 A | * | 6/1986 | Nicholson .................. | 426/262 |
| 4,754,638 A | * | 7/1988 | Brayman et al. ............ | 73/40.7 |
| 4,773,255 A | * | 9/1988 | Malcosky et al. ........... | 73/40.7 |
| 4,883,676 A | * | 11/1989 | Sophianopoulos et al. .. | 426/314 |
| 5,107,698 A | * | 4/1992 | Gilliam ...................... | 73/40.7 |
| 5,849,596 A | * | 12/1998 | Chu et al. .................. | 436/168 |
| 5,859,363 A | * | 1/1999 | Gouge ........................ | 73/40.7 |
| 5,922,944 A | * | 7/1999 | Pieroni et al. .............. | 73/40.7 |
| 6,142,009 A | * | 11/2000 | Loblick ....................... | 73/40.7 |
| 6,181,874 B1 | * | 1/2001 | Ireland et al. ............. | 392/497 |
| 6,233,908 B1 | * | 5/2001 | Rink et al. .................. | 53/440 |

OTHER PUBLICATIONS

Gilles et al., Feb. 22, 2000, ATI TDA 5A Aerosol Generator Evaluation, 25th DOE/RNC Nuclear Air Cleaning and Treatment Conference, pp. 90–97, especially p. 90.*

* cited by examiner

Primary Examiner—Daniel S. Larkin
Assistant Examiner—Charles D Garber
(74) Attorney, Agent, or Firm—Morland C. Fischer

(57) ABSTRACT

A smoke and clean air generating machine for detecting the presence and location of leaks in a fluid system (e.g. the evaporative or brake system of a motor vehicle). A source of gas (e.g. air or nitrogen) under pressure is delivered to a smoke generating apparatus or to a flow meter by way of a multi-position selector valve. With the selector valve in a first position, gas is delivered to the system under test via the flowmeter to detect the presence of a leak in need of repair depending upon the reading of the flow meter. With the selector valve in a second position, gas is delivered to the smoke generating apparatus so that smoke can be supplied to the system under test to locate the leak. With the selector valve in a third position between the first and second positions, pressure is bled from the machine to disable the smoke generating apparatus and thereby terminate the production of smoke.

9 Claims, 4 Drawing Sheets

To Flow Meter 32

From Gas Source 25,60

SMOKE AND CLEAN AIR GENERATING MACHINE FOR DETECTING PRESENCE AND LOCATION OF LEAKS IN A FLUID SYSTEM

BACKGROUND OF THE INVENTION

1. Field of the Invention

This invention relates to a compact, easy to use and portable smoke and clean air generating machine that enables the presence and location of leaks in a fluid system (e.g. the evaporative or brake system of a motor vehicle) to be accurately and visually detected depending upon the rate of air flow through the fluid system under test and whether smoke escapes from the system.

2. Background Art

Our patent application Ser. No. 09/020,841 filed Feb. 9, 1998 and entitled SMOKE PRODUCING APPARATUS FOR DETECTING LEAKS IN A FLUID SYSTEM discloses an efficient, portable apparatus for generating smoke in order to locate leaks in a fluid (e.g. air, oil, fuel, exhaust, etc.) system. A supply of oil within a sealed chamber is vaporized, and the resulting smoke is delivered to the system under test. By visually inspecting the system for smoke escaping therefrom, the precise location of a leak in the system can be accurately detected.

With the growing emphasis being placed on reducing the volume of emissions leaking into the atmosphere, it has become increasingly important to be able to monitor and test the integrity of a fuel vapor recovery or evaporative system in today's motor vehicles. By way of example, to test for leaks, the evaporative system of a motor vehicle is typically pressurized for a predetermined time. If the pressure holds throughout the time interval, then the integrity of the system is presumed to be intact.

The problem is that this conventional method of testing for leaks in the vapor recovery system of a motor vehicle does not take into account the volume of fuel stored in the gas tank. That is to say, the smaller the volume of fuel stored in the gas tank, the greater will be the empty space within the tank lying above the fuel supply. Such empty space acts an air and pressure accumulator. More particularly, for a vehicle with less fuel and a larger air space in its tank, it will take a longer time to detect a leak. Therefore, the test operator can receive a false indication as to the integrity of the evaporative system, because of the increased time that is required for this system having an air accumulator to be fully pressurized. Consequently, an evaporative system which shows that it is holding pressure over time may actually have a leak and be in need of repair to avoid emissions to the atmosphere.

Accordingly, it is desirable to be able to overcome the aforementioned problems associated with the conventional method of testing for leaks in a fluid system so that the existence and location of a leak may be accurately verified and detected. To this end, it would also be desirable to achieve this goal by using the efficient smoke generating apparatus that is described in our above-entitled patent application.

SUMMARY OF THE INVENTION

Briefly, and in general terms, a smoke and clean air generating machine is disclosed that is adapted to produce either a supply of clean air or a supply of smoke to a fluid system (e.g. the evaporative or brake system of a motor vehicle) to be tested for leaks. An air compressor provides a supply of air under pressure. The air compressor is connected to supply air to a smoke generating apparatus or to a flow meter by means of a two-way bleed off selector valve. More particularly, with the selector valve rotated to a clean air position, the air compressor will communicate with the flow meter which measures the rate of air being delivered to the system under test. With the selector valve rotated to a smoke position, the air compressor will be connected to the smoke generating apparatus so that a supply of oil in a sealed chamber can be blown towards and vaporized by a heating grid and the resulting smoke delivered to the system under test. However, when the selector valve passes through a center position between its smoke position and clean air position, any pressure that has been developed in the air line between the air compressor and the smoke generating apparatus will be exhausted (i.e. bled off) to the atmosphere so as to automatically de-energize the heating grid of the smoke generating apparatus and thereby insure that the heating grid will cool and no additional smoke will be generated.

In operation, the selector valve is first rotated to its clean air position, whereby a supply of clean (i.e. non-smoky) air is delivered from the air compressor to the system under test via the flow meter. An air accumulator having an integral check valve to relieve excess pressure is located between the selector valve and the flow meter to smooth any pulsations in the flow of air to the meter. The existence of a leak having sufficient size to require repair is indicated in the event that the flow meter reads a rate of air flow from the air compressor to the system under test which is greater than a predetermined flow rate that is characteristic of a leak free system. Should a leak be indicated, the selector valve is then rotated to its smoke position, whereby a supply of air is delivered from the air compressor to the smoke generating apparatus. The smoke generating apparatus generates a supply of smoke via a smoke outlet line thereof to the fluid system under test. By visually inspecting the system under test for any escaping smoke, the precise location of a leak can be determined. Coupled to the smoke outlet line of the smoke generating apparatus is a pressure discharge accumulator having an integral check valve that is adapted to open to relieve excess pressure. In the event of a pressure build-up in the smoke outlet line (such as when the system to be tested is partially or completely restricted), the smoke is diverted to the check valve. As the exiting smoke begins to cool and condense, droplets of oil will be collected within the pressure discharge accumulator. The excess pressure within the smoke outlet line will then be dissipated to the atmosphere through a small orifice in the accumulator.

As an alternate embodiment of the present invention, the air compressor to deliver clean air to the flow meter and the smoke generating apparatus can be replaced by a pressure and flow regulated source of non-flammable nitrogen gas. In this case, a mixture of nitrogen (rather than air) and smoke will travel through the smoke outlet line to be delivered to the system under test so that a relatively safe, non-explosive environment can be established, particularly in situations characterized by high temperatures.

DETAILED DESCRIPTION

Figure 1:
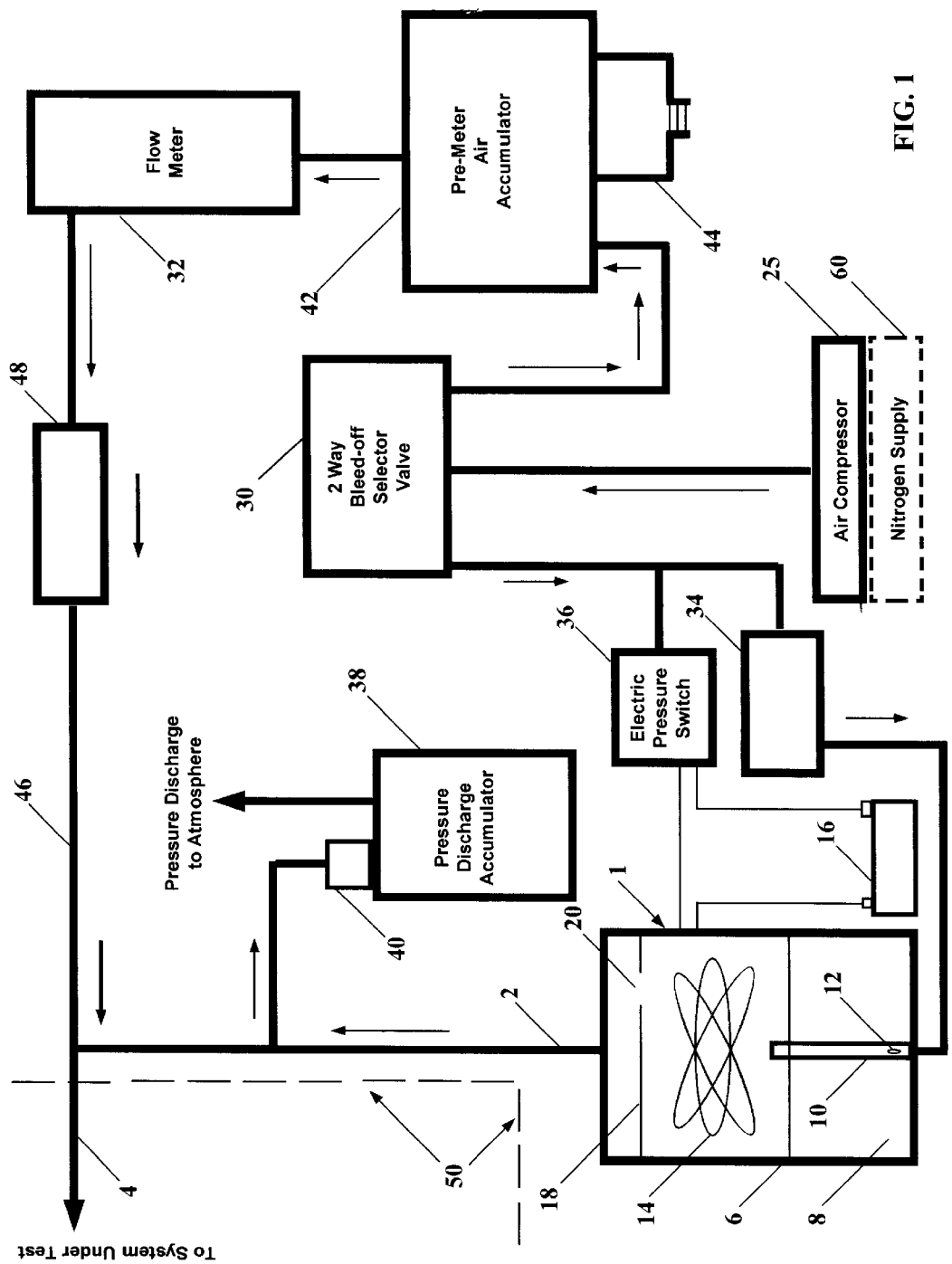
FIG. 1 illustrates a schematic of the smoke and clean air generating machine which forms the present invention for verifying the presence and detecting the location of leaks in a fluid system under test.

Referring to the drawings, there is shown in FIG. 1 a smoke and clean air generating machine having an outer casing (designated by phantom lines) 50 within which is housed a smoke generating apparatus 1 that is adapted to generate a supply of smoke to a smoke outlet line 2 and a smoke supply line 4 so that a fluid system (not shown) can be visually inspected for leaks. The smoke generating apparatus 1 has been described in detail in our earlier patent application Ser. No. 09/020,841 filed Feb. 9, 1998, the teachings of which are incorporated herein by reference. Therefore, a full description of the smoke generating apparatus 1 will not be provided.

Briefly, however, the smoke generating apparatus 1 includes a sealed chamber 6 which contains a non-toxic oil supply 8. An air inlet tube 10 projects upwardly from the bottom of chamber 6 and extends above the oil supply 8. Inlet tube 10 communicates with an external air compressor 25 through a wall of chamber 6. An inlet orifice 12 is formed in the air inlet tube 10 so as to lie within the oil supply 8 immediately above the bottom of chamber 6. A resistor heating grid (e.g. coil) 14 extends laterally across the sealed chamber 6 and is electrically connected to a 12 volt battery 16 by means of an electric pressure switch 36. A fluid baffle 18 having a smoke outlet orifice 20 formed therein extends laterally across the sealed chamber 6 above the heating grid 14. The aforementioned smoke outlet line 2 communicates with the outlet orifice 20 through the top wall of the sealed chamber 6.

In operation, when the pressure switch 36 is closed, the battery 16 supplies current to heat the heating grid 14, and the air compressor 25 delivers air into the sealed chamber 6 via air inlet tube 10 at approximately 14 liters/minute to cause some of the oil supply 8 within the chamber to be drawn, by means of suction through inlet orifice 12 and into the air inlet tube 10. A mixture of air and oil is then blown upwardly and outwardly from the air inlet tube 10 towards and into contact with the heating grid 18, whereby the, oil is instantaneously vaporized into smoke. The rising smoke travels through the outlet orifice 20. in fluid baffle 18 for receipt by the smoke outlet line 2. Accordingly, the smoke in outlet line 2 is carried by way of the smoke supply line 4 to the fluid system to be tested so that the integrity of the system may be visually inspected for leaks depending upon the absence or presence of smoke escaping therefrom.

In accordance with the present improvement, a two-way never closing bleed-off selector valve 30 is provided to control the flow of air from the compressor 25 to either the smoke generating apparatus 1, when it is desirable to generate smoke to be delivered to the system to be tested for leaks, or to a flow meter 32, when it is desirable to supply clean (i.e. non-smoky) air to the system to be tested. The selector valve 30 is rotated to a clean air position to connect the air compressor 25 to the flow meter 32, whereby clean air will by-pass the smoke generating apparatus 1 for receipt by the system to be tested via the smoke supply line 4 when it is desirable to verify the existence and size of a potential leak in the system. Since smoke carries oil and particulate matter, it is not desirable for smoke to pass through the flow meter 32. Such smoke can cause the flow meter 32 to malfunction and eventually fail.

The selector valve 30 is rotated to a smoke position to cause the air compressor 25 to communicate directly with the smoke generating apparatus 1, whereby smoke can be generated to identify the specific location of a leak in the system to be tested. As will be described in greater detail hereinafter when referring to FIGS. 2–4, the selector valve 30 is also rotated to a center position (i.e. during the transition between the smoke and clean air positions) when; it is desirable to bleed-off pressure that has been developed in the smoke outlet line 2 by the air compressor 25.

With the selector valve 30 rotated to the smoke position to connect the air compressor 25 to the smoke generating apparatus 1, air, under pressure, will be supplied to the air inlet tube 10 inside the sealed chamber 6 by way of a seven pound cracking pressure check valve 34. Pressure check valve 34 performs two different functions. In one case, the pressure check valve 34 functions as a conventional one-way check valve to block the reverse flow of oil from the smoke generating apparatus 1 to the selector valve 30. In addition, check valve 34 also prevents the backflow of oil from chamber 6 should the casing 50 be accidentally tipped. In a second case, the pressure check valve 34 establishes a back pressure in the air supply line between check valve 34 and air compressor 25. Such back pressure is required to activate the aforementioned electric pressure switch 36 which is connected to the battery 16 and which must be closed before current will be supplied from battery 16 to the heating grid 14 within the chamber 6 of smoke generating apparatus 1.

The electric pressure switch 36 is a conventional, normally open pressure activated contact switch. When the selector valve 30 is rotated to its smoke position, the normally open electric pressure switch 36 will be closed in response to the pressure that is established in the line between check valve 34 and air compressor 25. Once switch 36 is closed, a current path will be created between the battery 16 and the heating grid 14 of smoke generating apparatus 1 so that the droplets of oil that are blown towards heating grid 14 from oil supply 8 will be vaporized into smoke within chamber 6. However, as an important feature of this invention, when the selector valve 30 is rotated from its smoke position so as to move through the center position thereof (best described when referring to FIG. 4), an air path will be created through selector valve 30 by which to relieve the back pressure that was previously established behind check valve 34. In particular, such back pressure will be discharged through selector valve 30 to the air compressor 25 or to a soon to be described air accumulator 42. Hence, the electric pressure switch 36 will be responsive to such pressure loss, whereby to automatically return to its normally open switch condition and thereby break the current path between the battery 16 and the heating grid 14 of smoke generating apparatus 1. Accordingly, the heating grid 14 will cool and the generation of smoke will cease.

As another important feature of this invention, the smoke outlet line 2 from the sealed chamber 6 of smoke generating apparatus 1 is coupled to a pressure discharge accumulator 38 through a one pound cracking pressure check valve 40. As shown, the pressure check valve 40 is positioned upstream and between the smoke generating apparatus 1 and the system to be tested so as to be responsive to the output pressure of the smoke that is carried by the smoke outlet line 2 after selector valve 30 has been rotated to its smoke position. By virtue of the foregoing, when the smoke supply line 4 or the fluid system to be tested is partially or fully restricted, the pressure check valve 40 will open, whereby smoke and/or pressure that builds up within the smoke supply line 4 will be able to escape to the atmosphere through an orifice in the pressure discharge accumulator 38. At the same time, the open pressure check valve 40 will allow air (including any oil products that are carried therein) to continue to circulate through the chamber 6 of smoke generating apparatus 1 in order to produce smoke therewithin. Such continued circulation will advantageously prevent the heating grid 14 of smoke generating apparatus 1 from overheating at times when the system to be tested is blocked and smoke within the outlet line 2 would otherwise be trapped.

Locating the pressure check valve 40 after the smoke producing apparatus 1, rather than prior to the air inlet tube 10 of chamber 6 (e.g. between inlet tube 10 and pressure check valve 34), avoids an early release of some or all of the pressure which would reduce or eliminate the air and oil circulation process that is otherwise achieved in the manner described above by coupling the smoke outlet line from chamber 6 to the pressure check valve 40. Thus, with the present improvement, it will still be possible to generate smoke so as to locate any leaks in the fluid system to be tested even during situations where the fluid system and/or the smoke supply line 4 is partially or completely restricted.

Locating the combination of pressure discharge accumulator 38 and pressure check valve 40 upstream from the smoke generating apparatus 1 will permit any oil products that have been vaporized by the heating grid 14 and carried through an open check valve 40 to condense and collect within the accumulator 38 during less than full flow conditions in the smoke outlet line 2. Such condensation reduces the amount of unwanted oil that would otherwise be released into the environment from the pressure discharge accumulator 38 under abnormally high pressure conditions within the smoke outlet line 2 when the pressure check valve 40 is open. In other words, accumulator 38 collects the residue after the oil supply 8 from sealed container 6 is first vaporized by heating grid 14 into smoke and then condensed back into oil following contact with check valve 40. Without accumulator 38 to collect the oil residue, the oil carried by the smoke could build up on the outlet side of the pressure check valve 40 and eventually spill out each time that the check valve 40 would open to release pressure. Such oil spillage could be undesirably encountered at the exterior of the casing 50 in which the smoke generating apparatus 1, selector valve 30 and pressure check valve 40 are all housed and transported from place to place.

At such time when the selector valve 30 is rotated to its clean air position (when no smoke is being generated by apparatus 1), an air path is established between compressor 25 and a pre-meter air accumulator 42. Air accumulator 42 is preferably a hollow chamber or air damper that functions to reduce or dampen the fluctuation to which flow meter 32 would be subjected that might alter the reading of flow meter 32 as a consequence of the pulsations that are common to a piston-type air compressor, such as that which has been shown and described herein, and the opening and closing of a soon to be described check valve 44. In this same regard, it would be possible to eliminate the air accumulator 42 altogether if the air compressor 25 were replaced by a non-pulsating air pump. However, a pulsating piston-type air compressor 25 is preferable because it is known to be reliable and readily available for use in the present invention.

A one-half pound check valve 44 is coupled to the air accumulator 42. Check valve 44 functions to relieve excess pressure within the clean air supply line 46 when clean air is supplied via flow meter 32 and the system to be tested or the smoke supply line 4 is partially or fully restricted. It is important that the check valve 44 be positioned behind (i.e. downstream from) the flow meter 32. During clean air operation, with selector valve 30 rotated to its clean air position, if check valve 44 were located ahead of (i.e. upstream from) flow meter 32, then the flow meter 32 would continue to meter clean air passing therethrough even if the system to be tested or the smoke supply line 4 were blocked.

Connected in the clean air supply line 46 which runs from flow meter 32 to smoke supply line 4 is a directional check valve 48. Check valve 48 limits the flow of clean air from air compressor 25 to a single direction away from flow meter 32 so that smoke produced by smoke generating apparatus 1 will be unable to pass through the clean air supply line 46 to contaminate the flow meter 32 and loose pressure through check valve 44 which would undesirably reduce the efficiency of operation.

On the other hand, to maximize the efficiency of the smoke and clean air generating machine of this invention, it is important that the check valve 44 on the clean air side have a lower cracking or threshold pressure (e.g. one-half pound) than the cracking pressure (e.g. one pound) of the check valve 40 on the smoke side. As previously described, if the system to be tested or the smoke supply line 4 were partially or completely restricted after selector valve 30 is rotated to its clean air position, any excess pressure that is'built up in the clean air supply line 46 would escape through check valve 44 of air accumulator 42. However, if the cracking pressure of check valve 40 were less than the cracking pressure of check valve 44, then flow meter 32 will continue to meter air flow therethrough even during such high pressure conditions. By virtue of the present improvement, if the system to be tested or the smoke supply line 4 were blocked when the selector valve 30 is rotated to it smoke position, then the smoke generated by apparatus 1 will escape through check valve 40, since the directional check valve 48 will not allow the back flow of smoke through the clean air supply line 46 and towards flow meter 32.

Although the smoke generating apparatus 1 has been described above as receiving air under pressure from an air compressor 25, it is to be understood that gases other than air may be supplied to the air inlet tube 10 of apparatus 1 to cause a mixture of such gas and oil to be blown towards the heating grid 14. More particularly, testing the integrity of the evaporative system. in a motor vehicle is now required by the Environmental Protection Agency in many states. It has become essential to be able to verify if the evaporative system has a leak and then identify the location of the leak. As an alternative to pressurized air, carbon dioxide or nitrogen gas from a pressure and flow regulated tank or bottle 60 can be used because of their non-flammable and inert characteristics. That is to say, smoke carried by nitrogen gas would be relatively safe for testing the evaporative system of a motor vehicle which lies in a generally volatile environment of potentially explosive hydrocarbon vapors. Accordingly, the ability to produce smoke with nitrogen gas would provide a safe and efficient means for locating a leak in the evaporative system of a motor vehicle. Moreover, producing smoke with nitrogen gas rather than air would enable a variety of high pressure systems (e.g. an air brake system) to be tested at high operating temperatures but without the inherent risks of an explosion.

What is even more, other sources of air under pressure, other than air compressor 25, may be employed to blow the oil towards the heating grid 14. For example, conventional shop air such as that used by an automotive repair facility may be substituted for compressor 25.

The advantage provided by the smoke and clean air generating machine of this invention is not only the ability to indicate the precise location of a leak (when selector switch 30 is rotated to the smoke position), but also to first verify whether the system to be tested has a leak in need of repair (when selector switch 30 is rotated to the clean air position). More particularly, the flow meter 32 that is connected in the clean air supply line 46 is a non-regulating flow meter that has a ball indicator to provide a visual reading when the system to be tested has a leak that is of sufficient size to warrant repair. Flow meter 32 is first initialized to a flow rate setting that corresponds to a leak size in the fluid system of 1 millimeter in diameter, a size which is generally considered in the industry to represent the standard tolerance level of a fluid system before the repair of a leak is required. Of course, the initial setting of flow meter 32 could change in the event that the tolerance standards of fluid systems subjected to leaks also change.

Once the selector valve 30 is rotated to its clean air position to connect air compressor 25 to flow meter 32, should the fluid system have a leak size which is in tolerance (i.e. less than 1 millimeter) then the reading of flow meter 32 will be at or below the initialized flow rate, and no repair will be necessary. However, should the fluid system have a leak, the size of which is larger than 1 millimeter, then the reading of flow meter 32 will be above the initialized flow rate, such that the leak must be located and repaired. At this point, the selector valve 30 is rotated from its clean air position to its smoke position, whereby a supply of smoke is delivered from the sealed chamber 6 of smoke generating apparatus 1 to the system to be tested in the manner described above.

Figure 2:
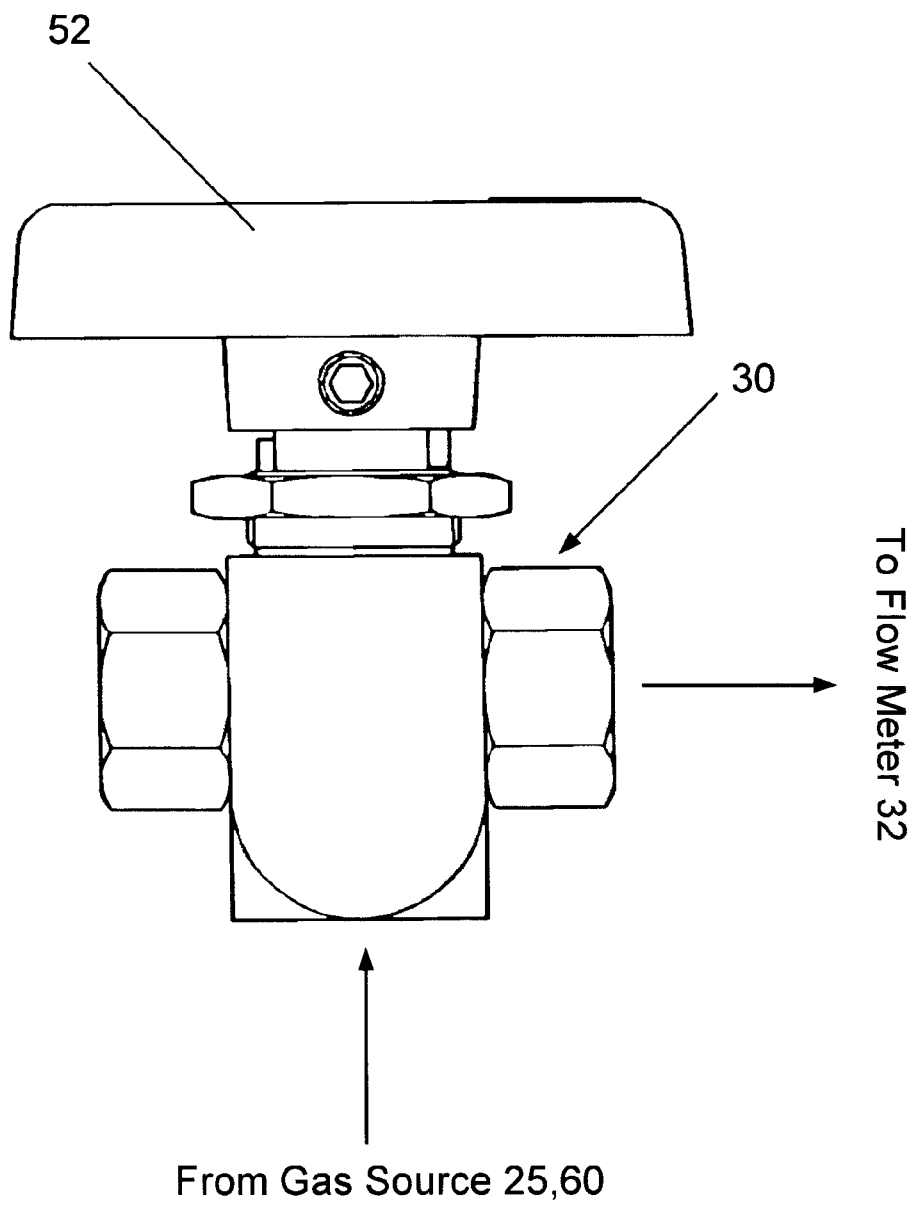
FIG. 2 shows a 2-way selector valve from the smoke and clean air generating machine of FIG. 1 rotated to a clean air position for connecting an air compressor to the fluid system under test by way of a flow meter.
Figure 3:
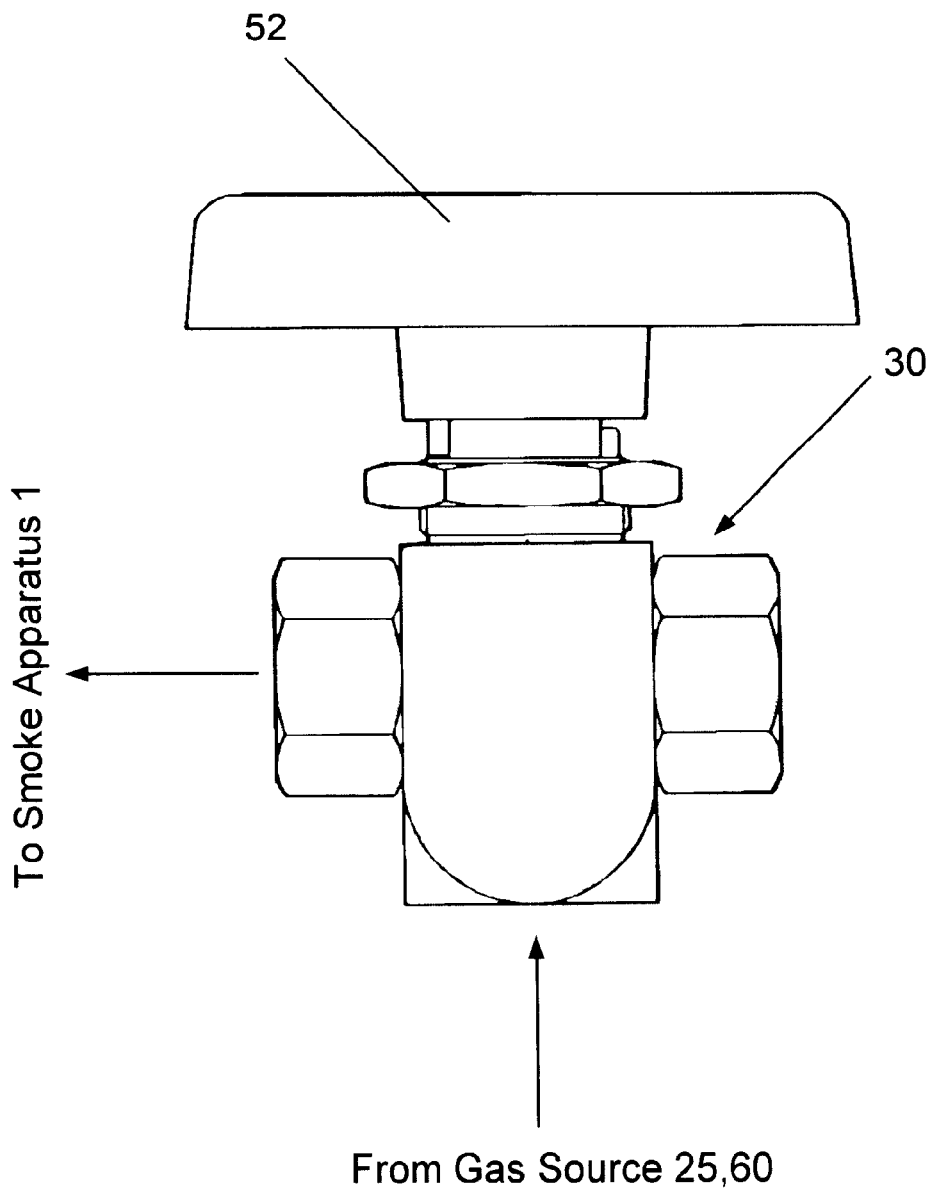
FIG. 3 illustrates the selector valve of FIG. 2 rotated to a smoke position to connect the air compressor to a smoke generating apparatus.
Figure 4:
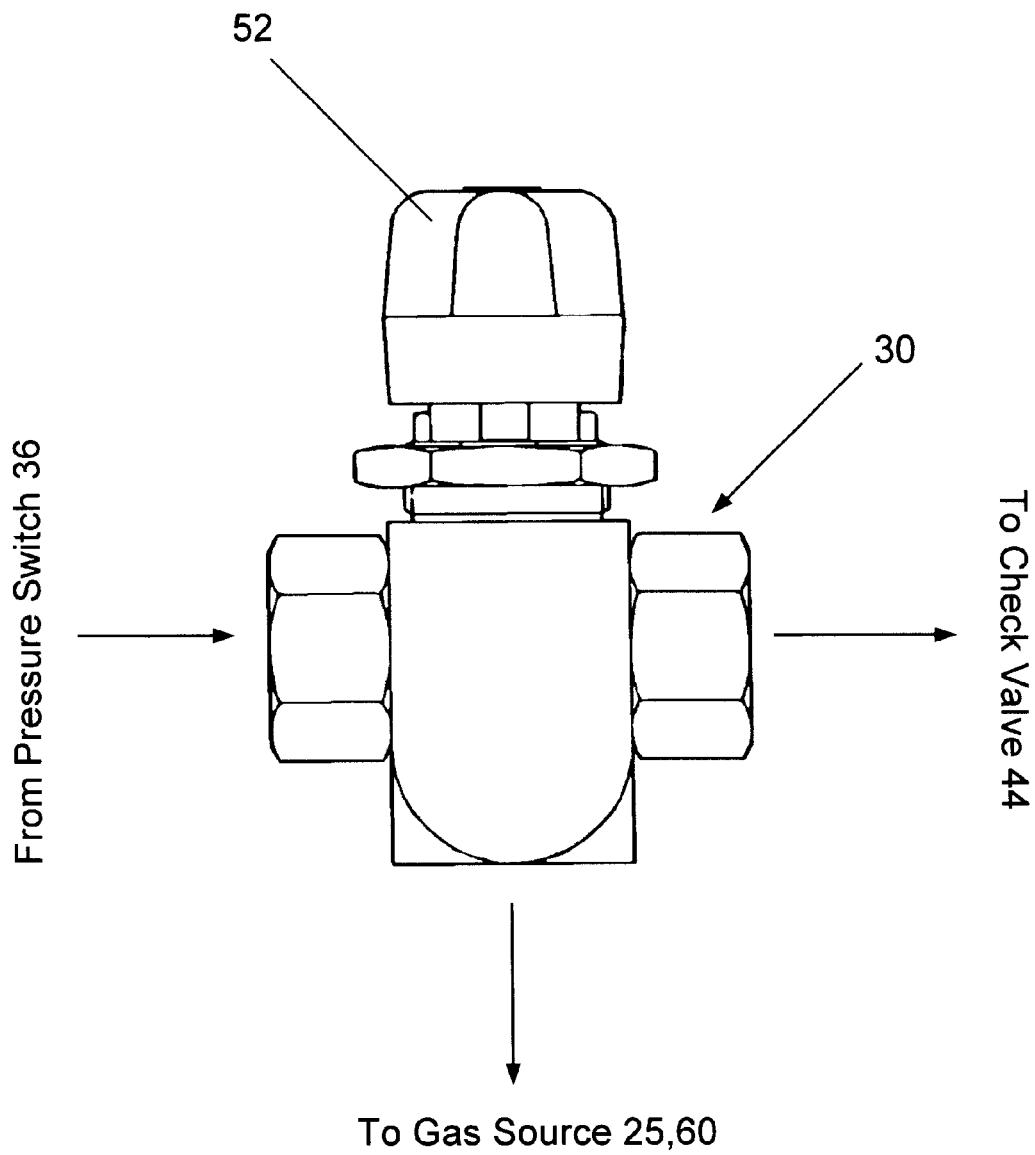
FIG. 4 shows the selector valve rotated to a center position between the clean air and smoke positions of FIGS. 2 and 3 for discharging pressure through the selector valve to control the operation of the smoke generating apparatus.

Turning now to FIGS. 2–4 of the drawings, details of the 2-way bleed-off selector valve 30 are now provided. FIG. 2 shows the selector valve 30 having a manually controlled knob 50 rotated to the clean air position in order to connect the air compressor 25 to the clean air side of the smoke and clean air generating machine of this invention so that a supply of clean air will be delivered to the system under test via the flow meter 32 in order to verify the presence of a leak having sufficient size to warrant repair. In this same regard, the air compressor 25 is disconnected from the smoke generating apparatus 1.

FIG. 3 shows the knob 52 of selector valve 30 rotated 180 degrees from the clean air position of FIG. 2 to the smoke position to connect the air compressors 25 to the smoke side of the smoke and clean air generating machine so that a supply of air will be delivered to the smoke generating apparatus 1. Smoke generated from the sealed chamber 6 of apparatus 1 is supplied to the system under test via smoke outlet line 2 in order to detect the precise location of the leak in need of repair depending upon a visual observation of smoke escaping through the leak. In this same regard, the air compressor 25 is disconnected from the flow meter 32.

FIG. 4 shows the knob 52 of selector valve 30 momentarily rotated through a center or neutral position during the transition of knob 52 from the smoke position of FIG. 3 to the clean air position of FIG. 2. In this case, an air path is established through selector valve 30 from the check valve 34 to the air compressor 25 and/or the air accumulator 42 in order to bleed off air pressure from pressure switch 36. As previously described, pressure switch 36 is responsive to such pressure loss and will return to its normally closed condition, whereby to disconnect the battery 16 from the heating grid 14 of smoke generating apparatus 1 so as to allow the heating grid to safely cool and thereby terminate the generation of smoke.

It may be appreciated that in a conventional selector valve, the center position thereof would typically allow no air to flow in either direction through the valve. However, selector valve 30 of the present invention is a never closing valve such that in its center position, the smoke side of the smoke and clean air generating machine is momentarily placed into communication with the clean air side whereby air pressure will be bled from the smoke side to cause a drop in pressure so that heating grid 14 will cool and no smoke will be generated. As described above, such bleeding off of the air pressure from the smoke side occurs only when selector valve 30 is moved through its center or neutral position and, unlike conventional valves, permits the aforementioned communication between the smoke and clean air sides to disconnect heating grid 14 from battery 16.

We claim:

1. A method for generating smoke for use at a volatile, potentially explosive environment, comprising the steps of:

locating a supply of flammable fluid within a closed smoke producing chamber, said closed smoke producing chamber having a gas inlet to receive a supply of non-combustible nitrogen gas under pressure and a smoke outlet to permit smoke to exit said closed smoke producing chamber;

locating a heating element within said closed smoke producing chamber so as to extend in spaced alignment with said supply of fluid;

supplying said non-combustible nitrogen gas under pressure to said closed smoke producing chamber via said gas inlet for blowing a mixture of said non-combustible nitrogen gas and said supply of flammable fluid against said heating element;

energizing said heating element for vaporizing into smoke said mixture of non-combustible nitrogen gas and said flammable fluid that is blown against said heating element, said non-combustible nitrogen gas preventing dieseling within said closed chamber and the possibility of an explosion at the volatile, potentially explosive environment at which the smoke will be used; and removing said smoke from said smoke producing chamber to the volatile potentially explosive environment via said smoke outlet.

2. The method recited in claim 1, wherein said gas inlet includes a tube that runs through and extends above said supply of fluid within said smoke producing chamber, said gas inlet tube having an inlet orifice located within said supply of fluid so that when said non-combustible nitrogen gas under pressure is delivered through said gas inlet tube, some of said supply of fluid is drawn into said gas inlet tube via said inlet orifice thereof to create said mixture to be blown against and vaporized by said heating element.

3. The method recited in claim 1, including the additional step of monitoring the pressure within said smoke outlet of said smoke producing chamber and discharging said pressure to the atmosphere when said pressure exceeds a predetermined pressure level.

4. The method recited in claim 3, including the additional step of locating a pressure discharge accumulator between said smoke outlet and the atmosphere, such that when the pressure in said smoke outlet is discharged to the atmosphere, the smoke within said smoke outlet will be condensed into droplets of said fluid supply and collected within said pressure discharge accumulator.

5. The method recited in claim 1, including the additional steps of monitoring the pressure of said non-combustible nitrogen gas being supplied under pressure to said smoke producing chamber via said gas inlet, energizing said heating element when the pressure of the nitrogen gas in said gas inlet is above a predetermined pressure and de-energizing said heating element when the pressure of the nitrogen gas in said gas inlet is below said predetermined pressure.

6. A method for generating smoke for use at a volatile, potentially explosive environment, said method comprising the steps of:

locating a supply of flammable fluid within a smoke producing chamber, said smoke producing chamber having a gas inlet to receive a non-combustible gas under pressure;

supplying said non-combustible gas under pressure to said smoke producing chamber via said gas inlet for blowing a mixture of said non-combustible gas and said supply of flammable fluid against a heating element and for creating an inert environment within said smoke producing chamber;

energizing said heating element for vaporizing into smoke said mixture of non-combustible gas and said flammable fluid that is blown against said heating element, said non-combustible gas preventing ignition and thereby avoiding the possibility of an explosion at the volatile, potentially explosive environment at which the smoke will be used; and delivering the smoke produced by said heating element to the volatile potentially explosive environment.

7. The method recited in claim 6, wherein said non-combustible gas is nitrogen gas.

8. The method recited in claim 6, wherein said non-combustible gas is carbon dioxide gas.

9. A method for generating smoke for use at a volatile, potentially explosive environment, said method comprising the steps of:

locating a heating element within a closed smoke producing chamber, said smoke producing chamber having a gas inlet and a smoke outlet;

delivering a flammable fluid to said heating element within the closed smoke producing chamber;

energizing said heating element for vaporizing into smoke the flammable fluid that is delivered thereto; and blowing a supply of non-combustible gas under pressure into the closed smoke producing chamber by way of said gas inlet thereof for (1) creating an inert environment within said chamber so as to prevent ignition and thereby avoid the possibility of an explosion when said flammable fluid is vaporized into smoke by said heating element and (2) for carrying the smoke to the volatile potentially hazardous environment by way of the smoke outlet of the closed smoke producing chamber.

* * * * *

UNITED STATES PATENT AND TRADEMARK OFFICE
CERTIFICATE OF CORRECTION

| | | |
|---|---|---|
| PATENT NO. | : 6,526,808 C1 | Page 1 of 1 |
| APPLICATION NO. | : 90/009683 | |
| DATED | : March 4, 2003 | |
| INVENTOR(S) | : Pieroni et al. | |

It is certified that error appears in the above-identified patent and that said Letters Patent is hereby corrected as shown below:

Title page, (Item 75) Inventors, Line 7, after "Jim", delete "El Saffle" and insert --Eli Saffie--.

Signed and Sealed this
Fifteenth Day of November, 2011

David J. Kappos
*Director of the United States Patent and Trademark Office*

(12) EX PARTE REEXAMINATION CERTIFICATE (8410th)
United States Patent
Pieroni et al.

(10) Number: US 6,526,808 C1
(45) Certificate Issued: Jul. 19, 2011

(54) SMOKE AND CLEAN AIR GENERATING MACHINE FOR DETECTING PRESENCE AND LOCATION OF LEAKS IN A FLUID SYSTEM

(75) Inventors: Kenneth Alan Pieroni, Fullerton, CA (US); Jim El Saffle, Santa Monica, CA (US)

(73) Assignee: EnviroTech, Inc., Costa Mesa, CA (US)

Reexamination Request:
No. 90/009,683, Mar. 18, 2010

Reexamination Certificate for:
Patent No.: 6,526,808
Issued: Mar. 4, 2003
Appl. No.: 09/348,320
Filed: Jul. 7, 1999

(51) Int. Cl.
*G01M 3/04* (2006.01)

(52) U.S. Cl. .......................................... 73/40.7
(58) Field of Classification Search .................. 73/40.7
See application file for complete search history.

(56) References Cited

U.S. PATENT DOCUMENTS

| | | |
|---|---|---|
| 4,484,195 A | 11/1984 | Shaffer |
| 4,547,656 A | 10/1985 | Swiatosz et al. |
| 4,568,820 A | 2/1986 | Swiatosz |
| 4,732,085 A * | 3/1988 | Gershenson et al. |
| 4,968,365 A | 11/1990 | Krone |
| 4,998,479 A | 3/1991 | Perham et al. |
| 5,094,168 A | 3/1992 | Rumer |
| 5,122,298 A | 6/1992 | Fry, Jr. et al. |
| H1124 H | 1/1993 | Rouse et al. |
| 5,369,984 A | 12/1994 | Rogers et al. |
| 5,922,944 A | 7/1999 | Pieroni et al. |
| 6,087,935 A | 7/2000 | Berner et al. |
| 2009/0298935 A1 | 12/2009 | Flanigan et al. |

FOREIGN PATENT DOCUMENTS

| | | |
|---|---|---|
| GB | 1039729 | 8/1966 |
| GB | 1064234 | 4/1967 |
| GB | 1243381 | 8/1971 |

OTHER PUBLICATIONS

Ballou, Ph.D., "Chemical Characterization and toxicologic Evaluation of Airborne Mixtures", Batelle Memorial Institute, Apr. 1981, in 12 pages, Richland, Washington.

Goodale, Thomas, "Improvement of the Performance of Carbon Smoke Generators by the Choice of Fuels and Fuel Additives", URS Systems Corporation, Jul. 8, 1968, in 11 pages, Burlingame, California.

Nowakowski, Paul, "Luminescent Smoke Generation Feasibility Study", Missouri Research Laboratories, Inc. May 1968, in 29 pages, St. Louis Missouri.

Liss–Suter, Deborah, et al., "Occupational Health and Safety Aspects of the Fog Oils SGF No.1 and SGF No. 2 and Smoke Screens Generated from them", SISD, The Franklin Institute Research Laboratories, Apr. 1978, in 12 pages, Philadelphia, Pennsylvania.

Sinclair K., et al., "The Performance Testing of The E. 19r1 Mechanical Smoke Generator", Porton Technical Paper No. 336, Copy 83, Feb. 10, 1953, in 40 years.

(Continued)

*Primary Examiner*—Robert Nasser

(57) ABSTRACT

A smoke and clean air generating machine for detecting the presence and location of leaks in a fluid system (e.g. the evaporative or brake system of a motor vehicle). A source of gas (e.g. air or nitrogen) under pressure is delivered to a smoke generating apparatus or to a flow meter by way of a multi-position selector valve. With the selector valve in a first position, gas is delivered to the system under tests via the flowmeter to detect the presence of a leak in need of repair depending upon the reading of the flow meter. With the selector valve in a second position, gas is delivered to the smoke generating apparatus so that smoke can be supplied to the system under test to locate the leak. With the selector valve in a third position between the first and second positions, pressure is bled from the machine to disable the smoke generating apparatus and thereby terminate the production of smoke.

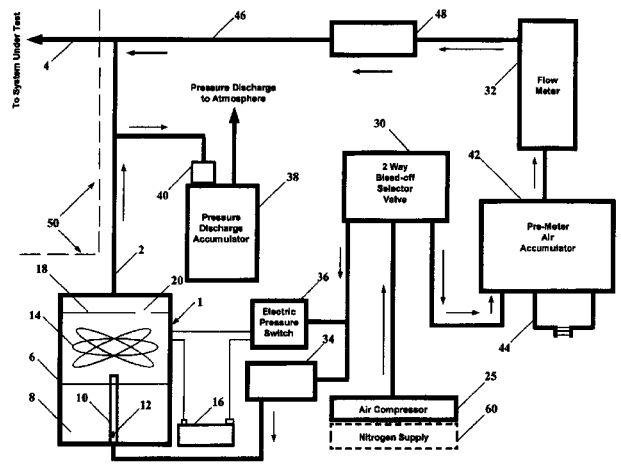

OTHER PUBLICATIONS

Zaytsev, et al., "Smoke Agents and Devices and Smoke-Producing Substances" Jan. 21, 1970, in 22 pages.

Grandmaison, E W., et al., "A smoke generation system for fluid dynamics research" 1987, pp. 605–608, Great Britain.

Vogelgesang, et al., "Agglomeration of magnetic fine particles in fluid dispersion" Apr. 15, 1985, 4277–4279, J. Appl. Phys. 57 (1), American Institute of Physics, Pittsburgh, Pennsylvania.

"Improved Smoke Generator for Low–Speed Wind Tunnels" Nasa Tech Brief Langley Reseach Center, Sep. 1971, Washington D.C. in 1 page.

Kaito, et al., "Magnetic Field Effect on the Growth of Ultra Fine Ferromagnetic Metal Particles", Journal of Crystal Growth 79, 1986, pp. 132–139, Elsevier Science Publishers B.V., North Holland, Amsterdam.

Roschke, E.J., "Oil–Smoke Generator for Use at Elevated Pressures" The Review of Scientific Instruments, May 1967, vol. 38, No. 5, pp. 686–688, Pasadena California.

Kays, et al., "Qualitative Description of Obscuration Factors in Central Europe", Athmospheric Sciences Laboratory, Sep. 1980, in 22 pages, White Sands Missile Range, NM.

Edited by Elkins & Kohl, "Proceedings of the Smoke/Obscurants Symposium V" Apr. 1981, in 25pages, Tullahoma, Tennessee.

U.S. Appl. No. 90/011,545, filed Mar. 7, 2011, Pieroni, et al.

U.S. Appl. No. 90/011,544, filed Mar. 7, 2011, Bandyard, et al.

"EPA I/M Costs, Benefits, and Impacts," p. 5, dated Nov. 1992.

IM240 & EVAP Technical Guidance; United States Environmental Protection Agency, Air and Radiation; EPA420–R–98–010; Aug. 1998; 46 pages.

USPTO Office Action mailed Sep. 25, 2002; Application No. 09/348,320; filing date Jul. 7, 1999; First Named Inventor Kenneth Alan Pieroni; 8 pages.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 9 is determined to be patentable as amended.

New claim 10 is added and determined to be patentable.

Claims 1-8 were not reexamined.

9. A method for generating smoke for use at a volatile, potentially explosive environment, said method comprising the steps of:

locating a heating element within a closed smoke producing chamber, said smoke producing chamber having a gas inlet and a smoke outlet;

delivering a flammable fluid to said heating element within the closed smoke producing chamber;

energizing said heating element for vaporizing into smoke [and] *within the closed smoke producing chamber* the flammable fluid that is delivered thereto;

blowing a supply of non-combustible gas under pressure into the closed smoke producing chamber by way of said gas inlet thereof for (1) creating an inert environment within said chamber so as to prevent ignition and thereby avoid the possibility of an explosion when said flammable fluid is vaporized into smoke by said heating element and (2) for carrying the smoke to the volatile potentially [hazardous] *explosive* environment by way of the smoke outlet of the closed smoke producing chamber, *said volatile potentially explosive environment being a closed system undergoing testing for leaks; and*

*connecting the smoke outlet of said closed smoke producing chamber to the closed system undergoing testing, said supply of non-combustible gas for creating an inert environment within the closed system to which the smoke is carried, said inert environment with the closed system preventing ignition within the closed system during the testing thereof;*

*wherein the closed system to be tested for leaks at the volatile, potentially explosive environment is the evaporative system of a motor vehicle including a fuel tank, further comprising delivering smoke from the smoke outlet of said smoke producing chamber to the fuel tank.*

*10. The method for generating smoke recited by claim 9, comprising the additional step of regulating the pressure at which the smoke is carried by said non-combustible gas from said closed smoke producing chamber to the closed system undergoing testing.*

* * * * *

US006526808C2

(12) EX PARTE REEXAMINATION CERTIFICATE (9017th)
United States Patent
Pieroni et al.

(10) Number: US 6,526,808 C2
(45) Certificate Issued: May 15, 2012

(54) SMOKE AND CLEAN AIR GENERATING MACHINE FOR DETECTING PRESENCE AND LOCATION OF LEAKS IN A FLUID SYSTEM

(75) Inventors: Kenneth Alan Pieroni, Fullerton, CA (US); Jim Eli Saffie, Santa Monica, CA (US)

(73) Assignee: Envirotech, Inc., Costa Mesa, CA (US)

Reexamination Request:
No. 90/011,916, Sep. 23, 2011

Reexamination Certificate for:
Patent No.: 6,526,808
Issued: Mar. 4, 2003
Appl. No.: 09/348,320
Filed: Jul. 7, 1999

Reexamination Certificate C1 6,526,808 issued Jul. 19, 2011

Certificate of Correction issued Nov. 15, 2011.

(51) Int. Cl.
*G01M 3/20* (2006.01)
*G01M 3/28* (2006.01)

(52) U.S. Cl. .................................................. 73/40.7
(58) Field of Classification Search ................. None
See application file for complete search history.

(56) References Cited

To view the complete listing of prior art documents cited during the proceeding for Reexamination Control Number 90/011,916, please refer to the USPTO's public Patent Application Information Retrieval (PAIR) system under the Display References tab.

*Primary Examiner* — John Heyman

(57) ABSTRACT

A smoke and clean air generating machine for detecting the presence and location of leaks in a fluid system (e.g. the evaporative or brake system of a motor vehicle). A source of gas (e.g. air or nitrogen) under pressure is delivered to a smoke generating apparatus or to a flow meter by way of a multi-position selector valve. With the selector valve in a first position, gas is delivered to the system under tests via the flowmeter to detect the presence of a leak in need of repair depending upon the reading of the flow meter. With the selector valve in a second position, gas is delivered to the smoke generating apparatus so that smoke can be supplied to the system under test to locate the leak. With the selector valve in a third position between the first and second positions, pressure is bled from the machine to disable the smoke generating apparatus and thereby terminate the production of smoke.

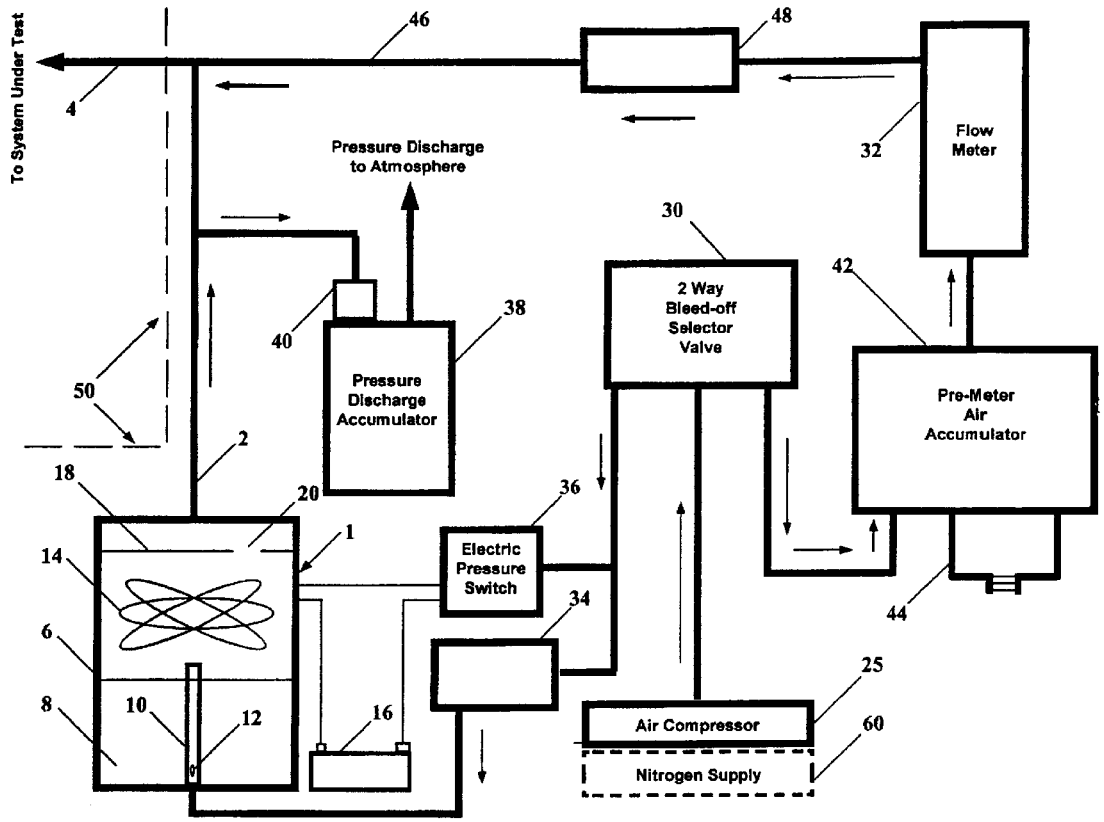

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 9 and 10 is confirmed.

Claims 1-7 and 8 were not reexamined.

\* \* \* \* \*